Dec. 16, 1969  A. B. SEGUR ET AL  3,483,591

METHOD FOR DEBONING RAW POULTRY MEAT

Filed June 14, 1967  4 Sheets-Sheet 2

INVENTORS:
ASA B. SEGUR
RODNEY J. LINDGREN

BY: Dawson, Tilton, Fallon & Lungmus
ATT'YS

Dec. 16, 1969  A. B. SEGUR ET AL  3,483,591
METHOD FOR DEBONING RAW POULTRY MEAT
Filed June 14, 1967  4 Sheets-Sheet 3
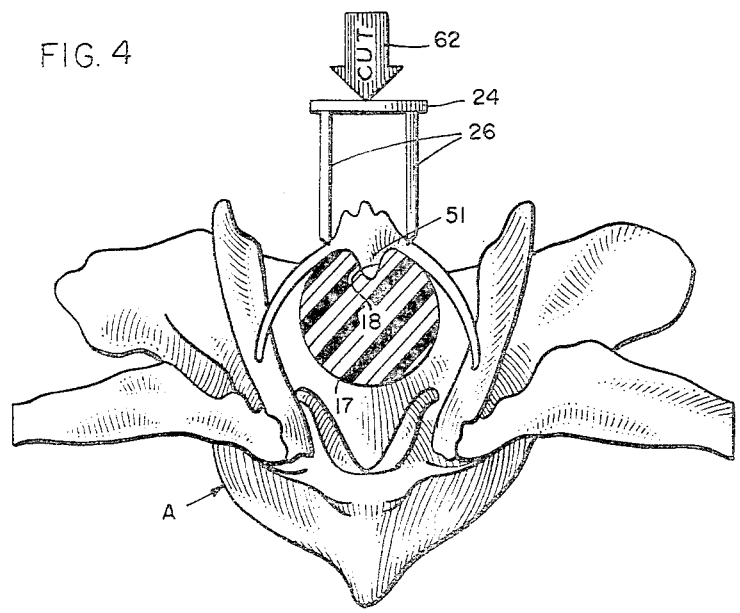
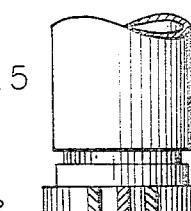
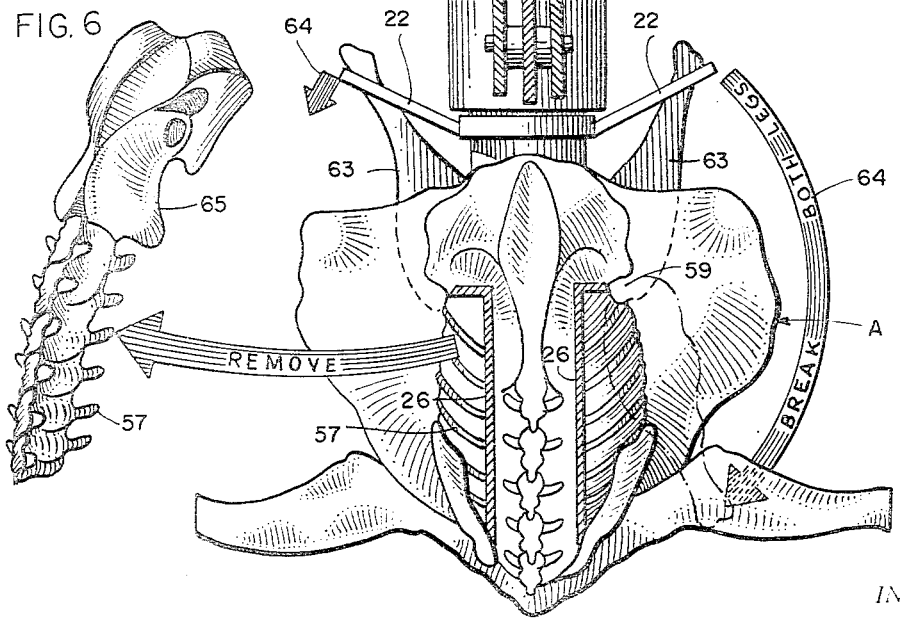
INVENTORS:
ASA B. SEGUR
RODNEY J. LINDGREN
BY: Dawson, Tilton, Fallon & Lungmus
ATT'YS

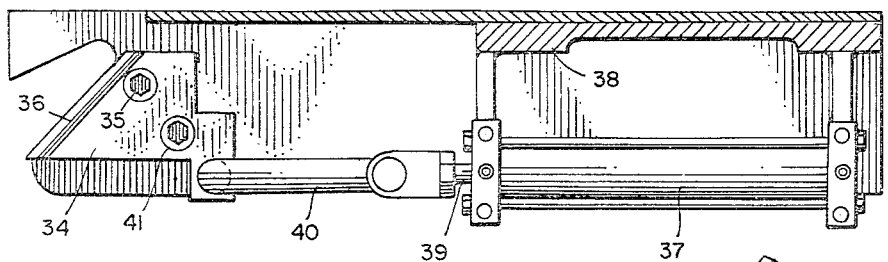
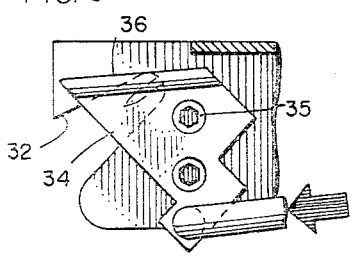
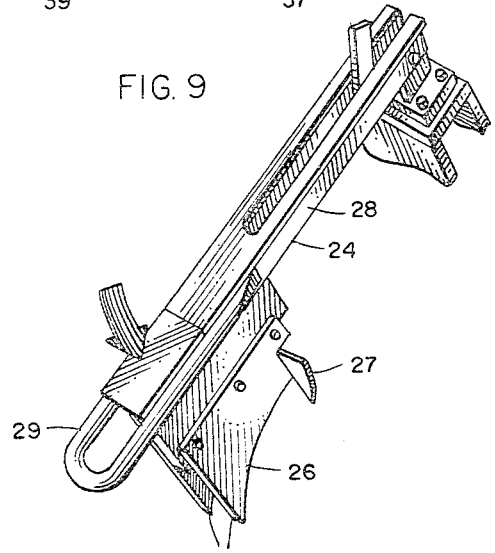
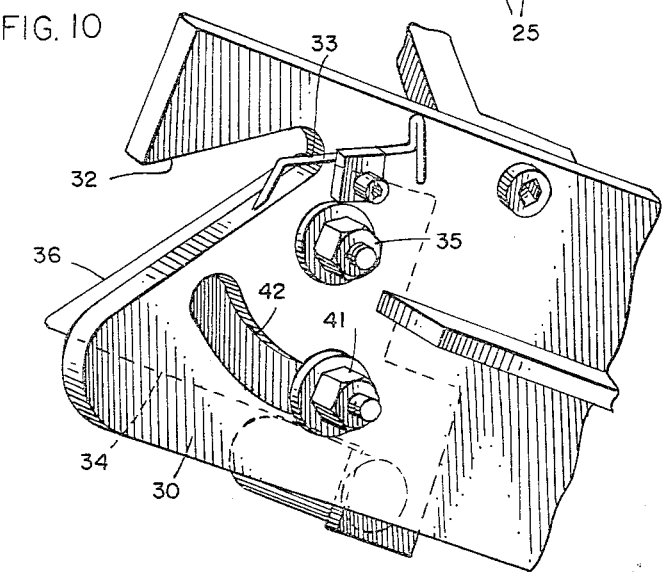

United States Patent Office 3,483,591
Patented Dec. 16, 1969

3,483,591
METHOD FOR DEBONING RAW POULTRY MEAT
Asa B. Segur, Oak Park, and Rodney J. Lindgren, Chicago, Ill.; said Lindgren assignor to said Asa B. Segur, doing business as Segur & Company, Oak Park, Ill.
Filed June 14, 1967, Ser. No. 645,949
Int. Cl. A22c 21/00
U.S. Cl. 17—46                                                                                                                                                                                                                                                                                                                                                                                        8 Claims

ABSTRACT OF THE DISCLOSURE

Method and fixture for use in deboning an uncooked poultry carcass. A tensioning element urged into the poultry carcass, and restraining elements engaging appendages thereof, firmly anchor the carcass in place to permit systematic and efficient detachment of raw meat by the use of two power-operated knives, one held in each of the operator's hands.

Background

Various procedures have been known and followed in the past for removing the skeletal components of turkets and other poultry while at the same time keeping the bulk of the skin and meat intack. In the most common of such procedures, the bird is hung by its appendages and is carried by an overhead chain to various stations where the bones are removed from the suspended carcass. In large meat processing plants there may be five or more operators, one at each station, each performing certain steps of the debonding operation on the suspended carcass. At the final station, the deboned meat is released from its support and is formed or folded into a boneless mass frequently referred to as a "turkey roll."

While the overhead suspension technique facilitates advancement of poultry carcasses from one station to the next, it generally provides inadequate support for the carcasses at each station, even where some supplemental means is improvised to brace and prevent rotation of the carcasses. In some plants, in order to provide more substantial support for the carcasses, the birds are supported upon a table and are simply passed from one operator to the next as specific cuts and bone-removal operations are performed. In all of such operations, whether the carcasses are suspended or are supported upon a table surface, the operators generally use one hand for cutting the meat and exposing the bones for removal, and the other hand for holding the carcass against movement. Thus, the actual cutting action is a one-handed operation.

The use of one hand to brace poultry during a cutting operation clearly reduces cutting efficiently but, despite efforts to increase such efficiency, the need for hand bracing of the carcasses during the deboning of raw poultry meat has been considered essential. It is necessary that the carcass be held firmly during cutting; if the carcass should inadvertently shift in its position, an excessive amount of meat may remain connected to the bones and additional cuts may be required. In some cases, an accidental cut caused by carcass movement may result in meat separation so that the raw meat no longer remains intact and more important, there is the real possibility that the operator may inadvertently injure the hand used for bracing the carcass. The danger would be particularly great should a power-operated electric knife be used, and it is believed that because of such dangers and problems electric knives have not been used in the raw boning of poultry carcasses despite the commercial availability of such instruments.

Summary of invention

The method and apparatus of the present invention are useful in the systematic and efficient removal of the skeletal components of uncooked turkeys and other poultry, although such method and apparatus as particularly disclosed herein relate only to initial steps of the complete procedure. During such initial steps, a poultry carcass is secured in place by means of appendage holding devices and by means of a tensioning element which not only enters the cavity of the carcass and provides a rigid support for the skeletal components thereof, but which also urges the carcass in a direction away from the holding devices, thereby tensioning the carcass between the appendage holding devices and the tensioning element.

An important aspect of the invention lies in mechanically supporting the carcass in a way that will not interfere with efficient manipulation of cutting knives and, specifically, in a way which leaves both hands of an operator free for simultaneous cutting of meat and bone removal. Power-driven electric knives are advantageously used by an operator, usually with one knife in each hand, to perform quickly and efficiently a series of predetermined cutting and meat-shaving operations on the rigidly supported carcass.

Since the carcass is fixed securely in place, the deboning steps may be performed much more quickly than in prior operations and with far less danger of mistake and possible injury to the operator. Furthermore, the steps are well defined and virtually eliminate the possibility that bone fragments might somehow be left in the meat following the deboning procedure.

Drawings

FIGURE 4 is a somewhat diagrammatic sectional view illustrating an optional final step in the operation of such fixture;

FIGURES 5 and 6 are top views illustrating in composite and schematic form a final step in the operation of the fixture of FIGURE 1;

FIGURE 7 is an enlarged side elevational view of a wing tip holding and cutting assembly as viewed from line 7—7 of FIGURE 5;

FIGURE 8 is a fragmentary view of the wing tip cutter of FIGURE 7 in closed condition;

FIGURE 9 is a completed fragmentary perspective view of the back cutter shown only partially in broken lines (in partly lowered condition) in FIGURE 1;

FIGURE 10 is an enlarged fragmentary perspective view illustrating details of the wing tip cutter.

Description

Figure 1:
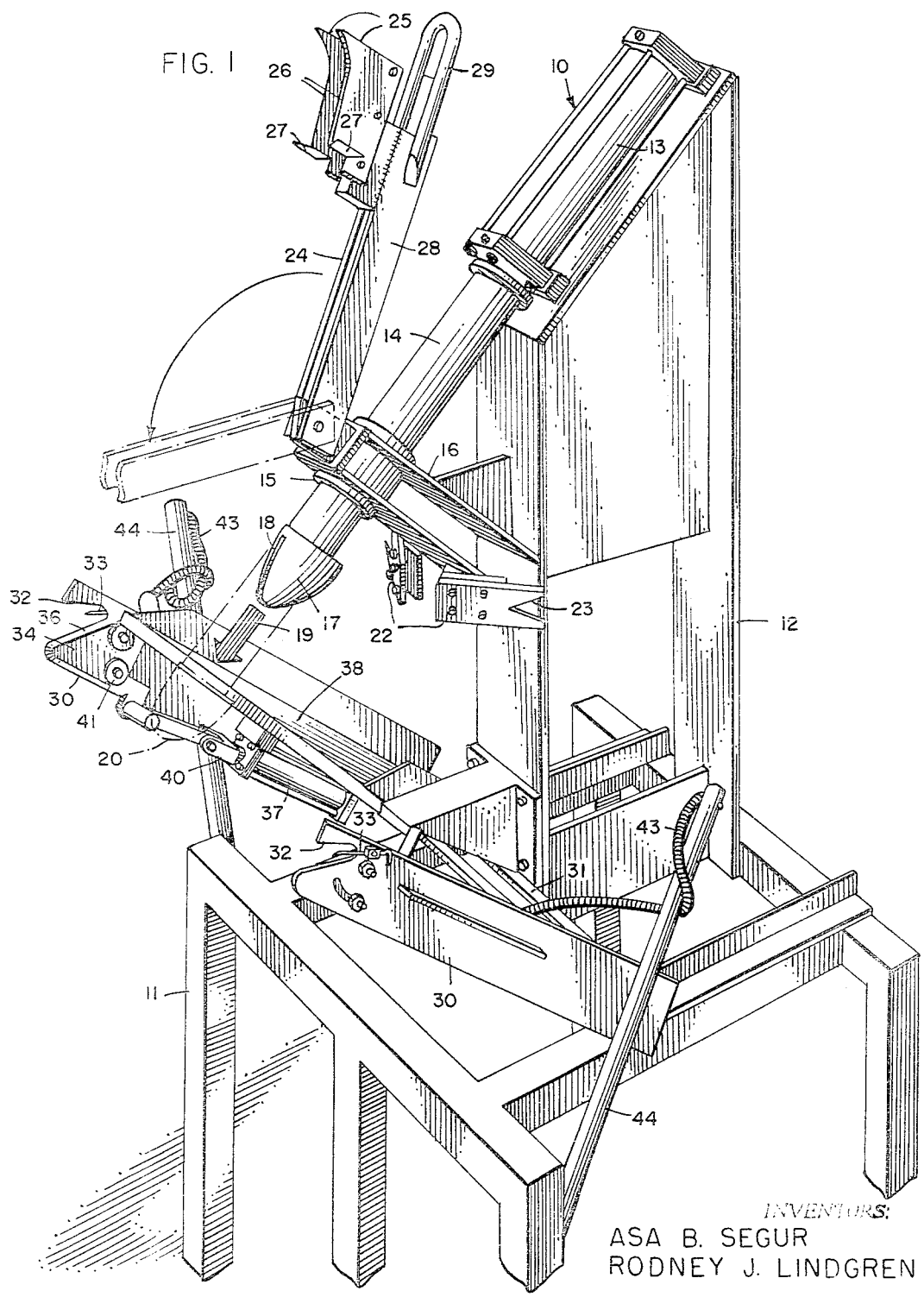
FIGURE 1 is a perspective view of a fixture embodying the present invention and used in carrying out the method thereof.

Referring to FIGURE 1, the numeral 10 generally designates a fixture for use in the exposing, and in some instances in removing, the back bone and closely-associated skeletal components in the deboning of uncooked poultry. The apparatus is proportioned for use in the processing of turkeys; however, it is to be understood that by varying the size and proportion of the parts, other poultry, such as chickens, ducks, and the like, might also be processed. In addition to the exposing of the back skeletal section of a carcass, fixture 10 is also used in removing the wing tips, detaching the legs from their sockets and, in general, for preparing a poultry carcass for subsequent meat-bone separation steps.

Fixture 10 includes a stationary base 11 adapted to be rigidly secured to a floor surface. A frame 12 projects upwardly from the base and at its upper end supports a downwardly and rearwardly inclined air cylinder 13. The exposed lower rear portion of the piston 14 constitutes a tensioning element. As shown, the tensioning element 14 is elongated and is of relatively large diameter and, as shown in FIGURE 1, extends through the guide ring 15 of a support bracket 16 secured to the mounting frame 12.

At its lower free end, element 14 is provided with a rounded knob portion 17 having an axially etxending groove 18 formed smoothly in its top surface. As shown in FIGURE 4, and for reasons which will appear hereinafter, the longitudinal groove 18 has a shape which conforms generally with the internal cross sectional contour of the vertebral column of a poultry carcass to be supported by the fixture.

The tensioning element or piston 14 is shown in FIGURE 1 in its normal raised position. However, upon re-direction of the flow of air through cylinder 13 by means of a foot-operated valve or other suitable flow-control means (not shown), the piston shifts in the direction of arrow 19 into the lowered operative position illustrated in broken lines in FIGURE 1.

Poultry leg gripping members 22 are rigidly secured to bracket 16 on opposite sides of a vertical mid plane passing through the axis of piston 14 and substantially below that axis. As shown in FIGURE 1, each member 22 consists of a plate bolted or otherwise secured to the bracket and having a laterally and forwardly facing V-shaped recess 23 extending inwardly from the front edge thereof.

Bracket 16 also provides the pivotal mounting for a cutter arm assembly 24. The assembly consists essentially of a pair of spaced parallel cutter blades 25 having sharpened edges 26 and lateral wing portions 27, the cutter blades being carried by an arm 28 pivotally connected at one end to bracket 16. The cutter arm assembly is movable between the raised position illustrated in FIGURE 1 and a lowered position wherein the sharpened edges of blades 25 overlie the extended knob or head 17 of extended piston 14. It will be noted that the cutting edges 26 are curved to conform generally with the curvature of the rounded head or knob 17. A handle 29 is affixed to the free end of arm 28 for the manual shifting of that arm between its raised and lowered positions.

Spaced laterally at equal distances from opposite sides of the vertical mid plane of piston 14 are a pair of wing holding and cutting assemblies 30. Each assembly comprises an elongated plate secured at its lower end to a cross bar 31 affixed to frame 12 and extending upwardly and rearwardly therefrom. Each plate 30 extends in a vertical plane and is provided with a rearwardly extending notch or recess 32 at its upper end. Within the recess and secured to the plate is a rearwardly extending pin 33 having a sharpened tip capable of piercing poultry meat. Since the plates are identical (but mirror opposites) and are mounted in the same fashion upon the frame, the recesses 32 of the respective plates are in horizontal alignment. Fuprthermore, an imaginary line passing from one recess to the other would extend through the head portion of the piston 14 when that piston is in extended position.

Along the inner surface of each plate 30 below recess 32 is a wing tip cutter blade 34 seen most clearly in FIGURES 7, 8 and 10. Each cutter blade is pivotally connected to its respective plate by a bolt 35 and is movable along the inner surface of the plate between a normally lowered position (FIGURES 7 and 10) and a raised position (FIGURE 8). When the blade is in its lowered position, its sharpened cutting edge 36 extends alongside the lower edge of recess 32 in generally parallel relation therewith, and when the blade is shifted into its raised position it closes off recess 32 to cut through any poultry appendage section which extends generally horizontally through that recess.

The blades are shifted between their raised and lowered positions by air cylinders 37 mounted upon a plate 38 which spans the spaced parallel members 30. As shown in FIGURE 7, the piston 39 of each cylinder is connected by linkage 40 to blade 34, and a bolt 41 secured to the blade and extending through arcuate recess 42 in plate member 30 (FIGURE 10) limits the extent of movement of the blade between its raised and lowered positions. The double acting cylinders 37 are actuated by a foot pedal or by any other suitable valving means (not shown).

While the structure designated by numeral 30 has been referred to as a wing cutting assembly, it is to be understood that such assembly may also (or alternatively) be used in cutting other appendages. For example, as brought out more fully hereinafter, the apendage cutting assemblies may be used to clip off the ends of the legs of a turkey carcass to expose the ends of the leg tendons to facilitate subsequent tendon pulling and removing operations.

A pair of tension springs 43 are mounted at points spaced laterally from each of the notched leg-gripping members 22. In the illustration given, the springs are carried by a pair of upstanding posts 44 affixed to base 11. Each of the elongated helical springs is equipped at its free end with a hook 45 (FIGURES 2 and 3) provided with an integral loop portion 45a which defines a finger receiving opening. Thus, an operator may readily grasp the hooks 45 by loop portions 45a to extend the springs and connect the hooks to, or disconnect them from, areas of skin and meat disposed on opposite sides of the synsacrum of a poultry carcass. The tension of the springs may be increased, if desired, by simply looping such springs one or more times about posts 44, as indicated in FIGURE 1.

Operation

The apparatus and method of the present invention are used in a procedure for removing the skeletal components from uncooked poultry which has been previously cleaned and dressed. Prior to the use of the fixture described above, and before any of the method steps of the invention are undertaken, the poultry is de-feathered and eviscerated, and the head, neck and feet are removed, in any conventional manner.

An operator first grasps an eviscerated and defeathered carcass A by the legs, one leg in each hand, with the legs facing forwardly away from the operator and with the backside of the carcass facing upwardly. Standing behind the fixture of FIGURE 1, and with piston 14 in its retracted position, he then hooks the distal ends of the drumstick bones 50 (tibiotarsus) within the V-shaped recesses 23 of the leg gripping members 22. The air cylinder 13 is actuated to drive the piston 14 downwardly into the body cavity of the poultry carcass through the evisceration opening in the rear portion of that carcass. The head of the piston moves downwardly and rearwardly until it engages the skeletal components within the front portion of the body cavity. Continued downward and rearward movement of the piston tends to shift the carcass rearwardly and downwardly and, since the legs are fixed in place by the notched leg gripping members 22, an axial tension is imposed on the carcass. In effect, the carcass is stretched between three points, one being the head of the probe of tensioning element and the other two being the laterally spaced leg gripping members.

Figure 2:
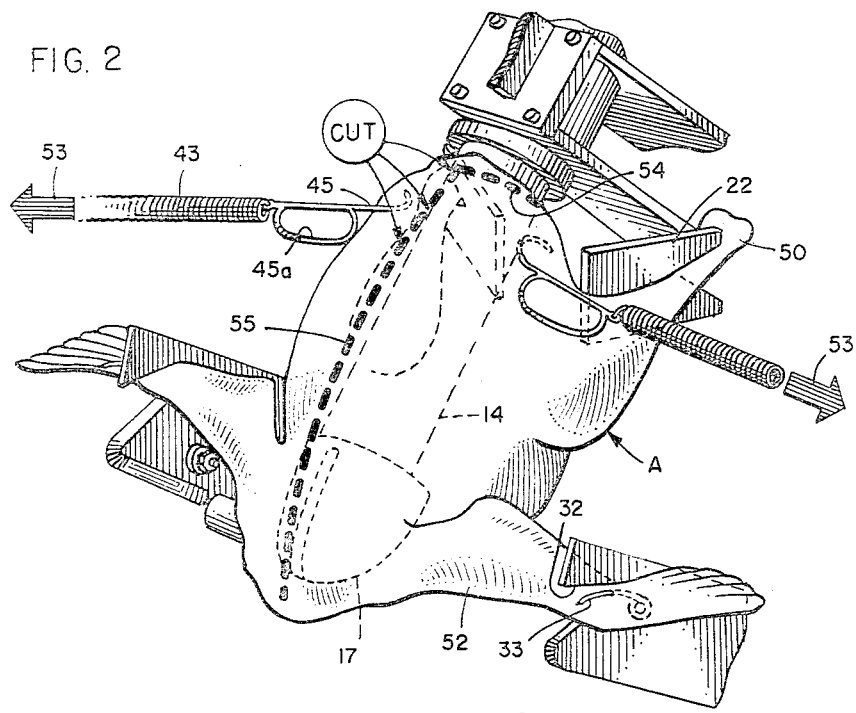
FIGURE 2 is a fragmentary perspective view of such fixture illustrating certain initial steps in its operation.

The position of the carcass A, supported by piston 14 and stretched between the head of the piston 17 and leg gripping members 22, is illustrated in FIGURE 2. The piston not only exerts a tensioning force upon the carcass, but also serves as the main body support for that carcass. As previously mentioned, the rounded head 17 is contoured to conform with the internal skeletal configuration of the carcass and is grooved at 18 to receive the internal ridge portion 51 of the vertebral column adjacent the carcass' pectoral girdle. The carcass is thus rigidly anchored against longitudinal, lateral, and rotational movement.

After extending the piston or probe 14, the operator grips the wings of the carcass, one in each hand, and hooks them in the notches 32 of the spaced wing supporting assemblies 30 (FIGURE 2). It should be noted that the wings 52 are hooked into the notches with the notched portions of the wing support assemblies disposd proximately of the radial-carpal joints. In other words, the "wrist" joints of the poultry wings are outboard with respect to the wing holding assemblies 30. Pins 33 pierce the skin and meat on the proximal side of such joints and help to anchor the wings in the outwardly-stretched positions shown in FIGURES 2 and 3.

The operator then grips the handles or loop portions 45a of spring-equipped hooks 45, stretches springs 43, and hooks devices 45 into the skin and meat on opposite sides of the synsacrum and on opposite sides of the longitudinal mid line of the carcass. The springs 43 exert outward forces as indicated by arrows 53 in FIGURE 2, thereby imposing lateral tensioning forces upon the skin and meat in the vicinity of of the synsacrum.

With the poultry carcass now fixed securely in position, the operator grips two knives, each of which may if desired consist of a conventional electric knife with parallel blades slidable relative to each other, with one knife held in each hand, simultaneously performs two cutting operations. One cutting operation is indicated by broken line 54 in FIGURE 2, the operator cutting off the tail of the carcass along that transverse line. At the same time, using the other electric knife, the operator cuts through the skin and meat along a longitudinal mid line 55 extending along the back of the carcass from line 54 to the extreme forward end of the carcass.

Thereafter, with the knives still in each hand, the operator then shaves the meat from the back skeletal components of the carcass, working first one one side of the center line of the carcass and then on the opposite side, as follows:

(a) Working from the center line cut, the operator urges the end of the electric knife laterally over the flat top surface of the synsacrum to release the meat therefrom.

Figure 3:
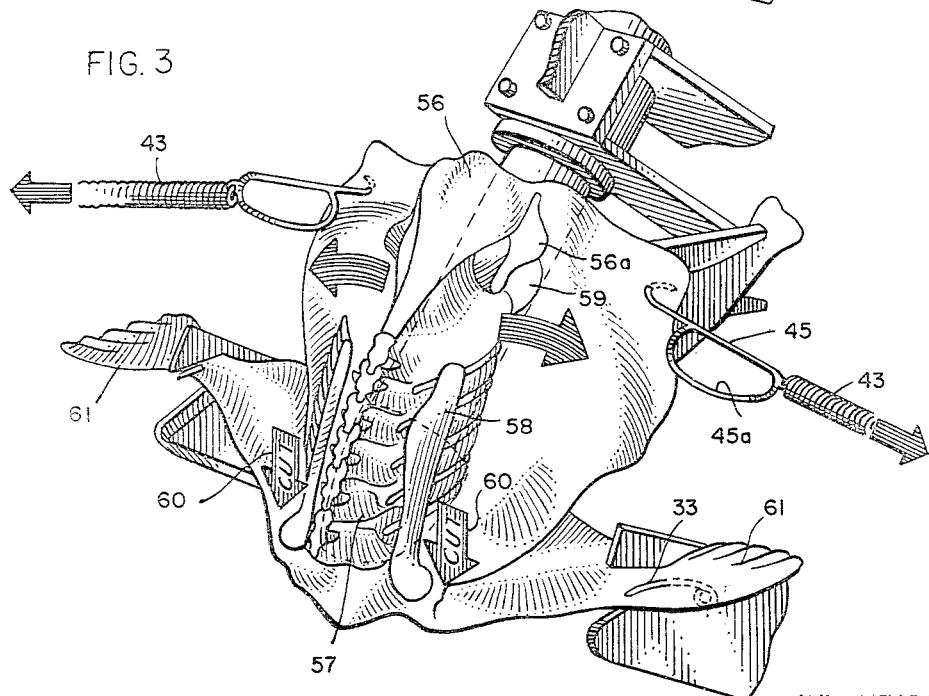
FIGURE 3 is a fragmentary perspective view similar to FIGURE 2 but illustrating subsequent steps of the fixture's operation.

(b) At the same time, with the knife held in the other hand, the operator cuts downwardly alongside the vertebral ribs 57 and within the confines of the scapulae 58 (FIGURE 3).

(c) The operator then urges the end of the electric knife downwardly to cut the meat free from the lateral surfaces 56a of the synsacrum directly above, and down to, the leg joint 59.

d) Finally, the attachment between the meat and the outside surfaces of the scapulae is broken by cutting along the lateral surfaces of scapulae 58.

The cutting operations (a) through (d) are preformed using two knives, preferably electric knives, and certain of such operations, such as (c) and (d) are performed simultaneously, the knife in one hand making one cut while the knife in the other performs a different cutting operation. The cutting operations are performed quickly and efficiently, using the electric knives held in both hands, because the carcass is securely supported by the fixture and because the areas in which the cutting occurs are easily accessible and readily visible to the operator. In this connection, it is to be noted that tension springs 43 and hooks 45 tend to pull the skin and meat outwardly as it is released from the skeletal components. By reason of the spring tension, the meat is pulled out of the way, leaving the operator a clear field for observing and cutting the connections between the meat and the bones.

Still using the electric knives, one in each hand, the operator now cuts the gristle and muscle attachments around the hip joint 59 (FIGURE 5) to expose the head of the femur. The purpose of this operation is to expose the end of the femur and make it easier to strip meat from that bone at a later station.

Again, with the electric knives, one in each hand, the operator shaves meat from the outside of the vertebral ribs 57, cutting downwardly from the outside of the scapulae. The shoulder joint is then cut in the direction indicated by arrow 60 (FIGURE 3) to disconnect the humerus of each wing from its atachment to the coracoids and scapulae. The wings remain affixed to the carcass, as shown in FIGURE 3, because of the skin and meat connections about the shoulder joint.

Now using any suitable knives, either electric knives of the type already described or conventional fixed-blade knives, the operator now performs two oeprations simultaneously, first on one side of the carcass and then on the other. In the first of these operations, he cuts caudally along the synsacrum 56 from the point at which the legs remain connected to the synsacrum. Secondly, he cuts anteriorly of the main leg joint to release meat from the ilium on each side of the carcass directly in front (anteriorly) of the hip (coxofemoral) joint. At the conclusion of these cutting steps, the carcass genrally assumes the appearance indicated in FIGURE 3, the meat being pulled outwardly from the longitudinal center line of the carcass by tension springs 43 and hooks 45 in the directions indicated by arrows. The axial skeleton of the carcass, including the vertebral and sternal ribs, the bones of the pelvic girdle, and the bones of the pectoral girdle, are all dorsally exposed. Hooks 45 are released from the meat and, if the wing tips 61 are to be removed then the wing tip cutter blades 36 are actuated to sever the tips along cutting lines disposed inwardly or proximately of the radial-carpal joints. In some cases it may be desirable to eliminate the wing tip cutting step and instead sever the wings from the carcass at the shoulder joints, as in the instance where the poultry wings are to be marketed separately and the turkey or poultry "roll" will not include meat from any part of the wings.

If the cutter arm assembly 14 is to be used, it is now lowered from its normal raised position in the direction indicated by arrow 62 in FIGURE 4. The laterally spaced cutting blades 26 cut through the vertebral ribs 57 on opposite sides of the backbone, thereby completely releasing the backbone and its attached rib segments, and the pelvic girdle, except for the remaining interconnections between the pelvic gridle and the legs 63 at the hip joints 59. With the cutter blade assembly in its lowered position, the operator grips legs 63 of the poultry carcass, one in each hand, and rotates them anteriorly approximately 160 degrees into generally parallel alignment with the extended piston 14, thereby completely detaching the leg bones (tibiotarsus) from the hip sockets. The direction of such movement is indicated in FIGURE 6 by arrows 64. Detachment of the legs from the hip sockets completely frees the severed axial skeleton 65 or, more accurately, frees the remainder of the carcass from the axial skeletal section 65 cut by cutter blade assembly 24. As previously indicated, such axial skeletal section includes not only the backbone but also the pelvic girdle of the poultry carcass.

At the same time that legs 63 are detached from the leg gripping plates 22 and rotated anteriorly, the operator retracts piston 14. Since rotation of the legs releases them from their hip sockets, the carcass is now divided into two main sections, one section being the axial skeletal components 65 from which the meat has been removed, and the other being the bulk of the carcass on which the meat remains which is supported by the operator who is holding on to the legs 63. Without releasing his hold upon the poultry legs, the operator simply shifts the carcass to the next processing station, leaving the severed axial skeletal components 65 to fall downwardly into a suitable waste receptacle when the cutter bar assembly is returned to its raised position.

As previously indicated, use of the cutter bar assembly is not essential. Whether it is used or not depends on the nature of subsequent meat removal procedures. In some instances, as where the fixtures at subsequent stations (not shown) are adapted to support the remainder of the carcass by means of the sternum, use of the cutter assembly and removal of back section 65 may be desirable for the purpose of eliminating skeletal components from which meat has been removed and for exposing more fully those components upon which meat is still affixed. On the other hand, where subsequent fixtures are designed to support the carcass by means of the cleaned back skeleton, the vertebral column must be left intact and, hence, the cutter assembly will not be used.

While in the foregoing we have disclosed the method and apparatus of the invention in considerable detail for purposes of illustration, it will be understood by those skilled in the art that many of these details may be varied without departing from the spirit and scope of the invention.

We claim:

1. In a method for supporting an eviscerated and defeathered poultry carcass for removal of skeletal components therefrom, the steps of anchoring the ends of the legs of said carcass at spaced points and against forward movement thereof, and then urging a tensioning member forwardly into the body cavity of said carcass through the evisceration opening thereof until said member engages the skeletal components within the forward portion of said cavity and tensioning said carcass between the point of said member's engagement and the spaced points at which the ends of said legs are anchored.

2. The method of claim 1 in which said steps are performed while said carcass is oriented in a generally prone position.

3. In a method for supporting an eviscerated and defeathered poultry carcass for removal of skeletal components therefrom, the steps of anchoring the ends of the legs of said carcass at spaced points and against forward movement thereof, and then urging a tensioning member forwardly into the body cavity of said carcass through the evisceration opening thereof until said member engages the skeletal components within the forward portion of said cavity and tensions said carcass between said point of engagement and the spaced points at which the ends of said legs are anchored, and stretching the wings of said carcass outwardly and clamping said wings at fixed points spaced laterally from opposite sides of said tensioning member.

4. The method of claim 3 in which said wings are clamped inwardly of the radial-carpal joints thereof, and thereafter cutting off the tips of said wings along cutting lines disposed adjacent and inwardly of said radial-carpal joints.

5. In a method for supporting an eviscerated and defeathered poultry carcass for removal of skeletal components therefrom, the steps of anchoring the ends of the legs of said carcass at spaced points and against forward movement thereof, and then urging a tensioning member forwardly into the body cavity of said carcass through the evisceration opening thereof until said member engages the skeletal components within the forward portion of said cavity and tensions said carcass between said point of engagement and the spaced points at which the ends of said legs are anchored, cutting the skin and meat along the longitudinal mid line of the back of said carcass, and urging the skin and meat laterally away from said longitudinal mid line to expose the axial skeletal components of said carcass.

6. The method of claim 5 in which lateral tensioning forces are applied to the skin and meat at the back rear portion of said carcass prior to the cutting of said skin and meat along said longitudinal mid line, whereby, upon cutting along said longitudinal mid line, said skin and meat is urged laterally in opposite directions to expose axial skeletal components and to facilitate the release of meat from said components.

7. The method of claim 5 in which said tensioning step also includes supporting said axial skeletal components by engaging a substantial portion of the internal surface contour of the same with said member.

8. The method of claim 7 in which there is the further step of providing a pair of generally parallel spaced cuts along the exposed back skeletal components of said carcass while the same is supported upon said tensioning member to sever the ribs of said carcass from the backbone thereof.

References Cited

UNITED STATES PATENTS

| | | | |
|---|---|---|---|
| 1,433,628 | 10/1922 | Knaust | 17—45 |
| 2,844,844 | 7/1958 | Sieczkiewicz | 17—45 |
| 3,057,006 | 10/1962 | Cutrera | 17—45 |
| 3,348,261 | 10/1967 | Segur | 17—45 |

LUCIE H. LAUDENSLAGER, Primary Examiner

U.S. Cl. X.R.

17—11